(12) United States Patent
Haldenby et al.

(10) Patent No.: US 10,447,664 B2
(45) Date of Patent: Oct. 15, 2019

(54) INFORMATION MASKING USING CERTIFICATE AUTHORITY

(71) Applicant: The Toronto-Dominion Bank, Toronto (CA)

(72) Inventors: Perry Aaron Jones Haldenby, Toronto (CA); Arthur Carroll Chow, Toronto (CA); Paul Mon-Wah Chan, Toronto (CA); John Jong Suk Lee, Toronto (CA); Linda Tao, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 313 days.

(21) Appl. No.: 15/281,433

(22) Filed: Sep. 30, 2016

(65) Prior Publication Data

US 2018/0097783 A1    Apr. 5, 2018

(51) Int. Cl.
*H04L 29/06* (2006.01)
*H04L 9/08* (2006.01)
*H04L 9/14* (2006.01)
*H04L 9/32* (2006.01)

(52) U.S. Cl.
CPC ........ *H04L 63/0442* (2013.01); *H04L 9/0861* (2013.01); *H04L 9/14* (2013.01); *H04L 9/3247* (2013.01); *H04L 9/3263* (2013.01)

(58) Field of Classification Search
CPC ............. G06F 21/64; G06F 2221/0788; H04L 63/045; H04L 63/0823; H04L 63/0442; H04L 63/061
USPC ......................................................... 713/156
See application file for complete search history.

(56) References Cited

U.S. PATENT DOCUMENTS

| | | | | |
|---|---|---|---|---|
| 8,935,529 B2* | 1/2015 | Cheng | .................... | H04L 63/06 380/255 |
| 2006/0274899 A1* | 12/2006 | Zhu | ......................... | H04L 9/083 380/281 |
| 2009/0307759 A1* | 12/2009 | Schnell | .................... | G06F 21/10 726/4 |
| 2011/0131414 A1* | 6/2011 | Cheng | .................... | H04L 63/06 713/170 |
| 2013/0314249 A1* | 11/2013 | Le Buhan | .............. | G01D 4/002 340/870.02 |
| 2015/0127944 A1* | 5/2015 | Bell | ....................... | H04L 9/3247 713/170 |
| 2015/0172046 A1* | 6/2015 | Reilly | ................... | H04L 9/0833 713/182 |
| 2016/0226830 A1* | 8/2016 | Steeves | .............. | H04L 63/0428 |

(Continued)

OTHER PUBLICATIONS

Junqueira et al, Durability with BookKeeper,Jan. 2013, ACM, vol. 47, issue 1, , pp. 9-15.*

(Continued)

*Primary Examiner* — Christopher J Brown
*Assistant Examiner* — Jenise E Jackson
(74) *Attorney, Agent, or Firm* — Duane Morris LLP

(57) ABSTRACT

An apparatus for use in a digital messaging system includes a storage device and a processor coupled to the storage device. The storage device storing software instructions for controlling the processor that when executed by the processor configured the processor to: generate a first message comprising a payload portion; encrypt the payload portion of the message; derive a first session key from a domain-specific key; and sign the message using the first session key.

17 Claims, 7 Drawing Sheets

(56) References Cited

U.S. PATENT DOCUMENTS

| | | | | |
|---|---|---|---|---|
| 2016/0323268 A1* | 11/2016 | Von Bokern | .......... | H04L 63/061 |
| 2017/0134352 A1* | 5/2017 | Abbott | .................. | H04L 9/0825 |
| 2017/0366342 A1* | 12/2017 | Gehrmann | .............. | H04W 4/70 |
| 2018/0048460 A1* | 2/2018 | Goldstein | ................. | H04L 9/06 |

OTHER PUBLICATIONS

Biryukov et al, Deaonynnisation of Clients in Bitcoin P2P Network, Nov. 7, 2014, ACM, pp. 15-29.*

* cited by examiner

INFORMATION MASKING USING CERTIFICATE AUTHORITY

BACKGROUND

Communication of sensitive information through multiple parties presents issues of data interception, unauthorized viewing, and/or data control and validation. For example, middle parties (such as brokers) may read and/or modify the data during transmission. End-to-end encryption has been used to mask data traveling through transmission channels. However, end-to-end encryption is restrictive and prevents certain use cases which require an intermediate party to pre-process and/or read restricted portions of the data.

Communication of sensitive information also presents issues of tracking or tracing the source of the information. Current systems are not able to mask the original source of messages or provide a path agnostic delivery process. Instead, intermediary parties must be trusted to not trace or track communications. Brokers handling communications from multiple parties may be able to obtain sensitive and/or restricted information based on message transmission paths.

SUMMARY

In various embodiments, an apparatus for use in a digital messaging system is disclosed. The apparatus includes a storage device and a processor coupled to the storage device. The storage device stores software instructions for controlling the processor that when executed by the processor configured the processor to: generate a first message comprising a payload portion; encrypt the payload portion of the message; derive a first session key from a domain-specific key; and sign the message using the first session key.

In various embodiments, an apparatus for use in a digital messaging system is disclosed. The apparatus includes a storage device and a processor coupled to the storage device. The storage device stores software instructions for controlling the processor that when executed by the processor configured the processor to: receive a first validation request from a first device. The validation request includes a signature generated by a session-specific key and an identified group associated with a certificate stored on a distributed ledger. The processor is further configured to determine whether the session-specific key is derived from a master key associated with the certificate. The master key is maintained on the distributed ledger. If the session-specific key is derived from the master key, the processor transmits a validation message to the first device. The validation message indicates the signature is valid. If the session specific key is not derived from the master key, the processor transmits an invalidation message to the first device. The invalidation message indicates that the signature is not valid.

In various embodiments, a method of secure, path agnostic transmission is disclosed. The method includes generating, by a first device, a first message comprising a payload portion including data intended for a second device. A first session key is derived from a domain-specific key. The domain specific key is associated with a certificate stored on a distributed ledger. The certificate is associated with a plurality of domains and the first device is associated with one of the plurality of domains. The first message is signed by the first device using the first session key. A signature is generated according to a cryptographic signature process.

BRIEF DESCRIPTION OF THE FIGURES

The following will be apparent from elements of the figures, which are provided for illustrative purposes and are not necessarily to scale.

DETAILED DESCRIPTION

This description of the exemplary embodiments is intended to be read in connection with the accompanying drawings, which are to be considered part of the entire written description. The use of the singular includes the plural unless specifically stated otherwise. The use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
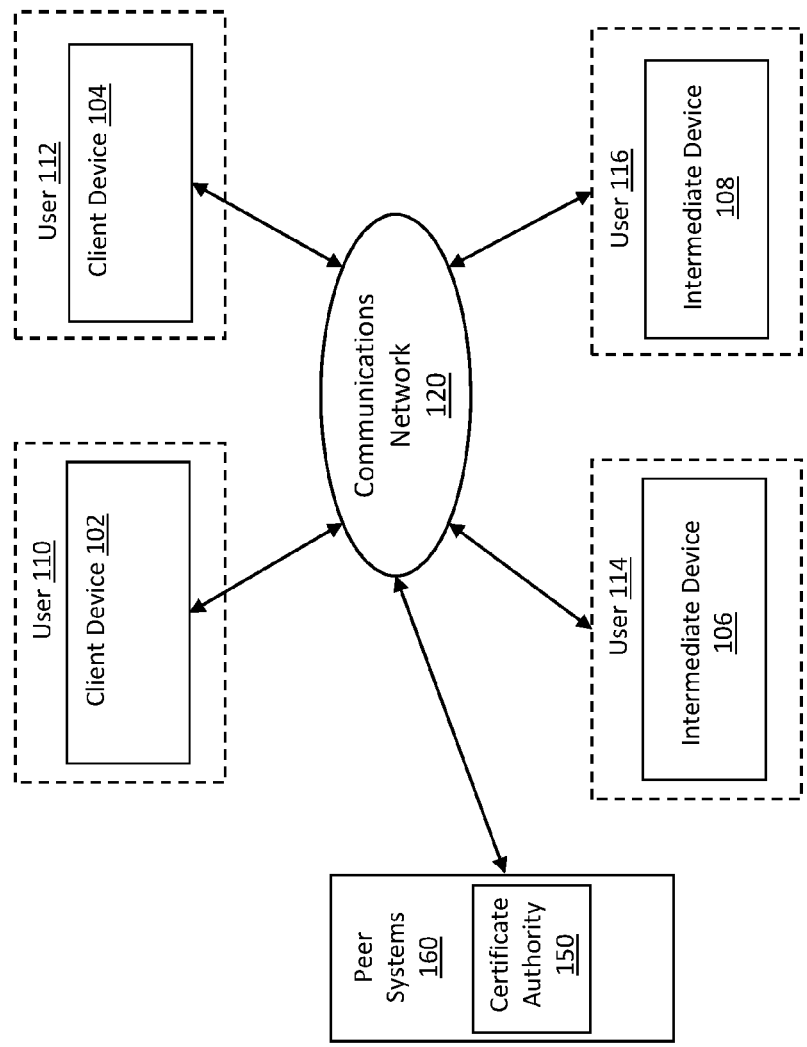
FIG. 1 is a block diagram of a system, in accordance with some embodiments.

FIG. 1 is a block diagram of a system 100 in accordance with some embodiments of the present disclosure. System 100 may be a computing environment including client devices 102, 104, intermediate devices 106, 108, one or more peer systems 160, and a communications network 120 connecting various components of system 100. Although two client devices 102, 104 and two intermediate devices 106, 108 are shown in this example, any number of client devices and/or intermediate devices may be present. Various components of computing environment 100 are configured to address problems associated with conventional end-to-end encrypted communication and certificate authorities by providing a system and method configured for secure, path agnostic transmission of one or more messages. In some embodiments, the disclosed systems and method eliminate the need for trusted intermediate systems.

Figure 2:
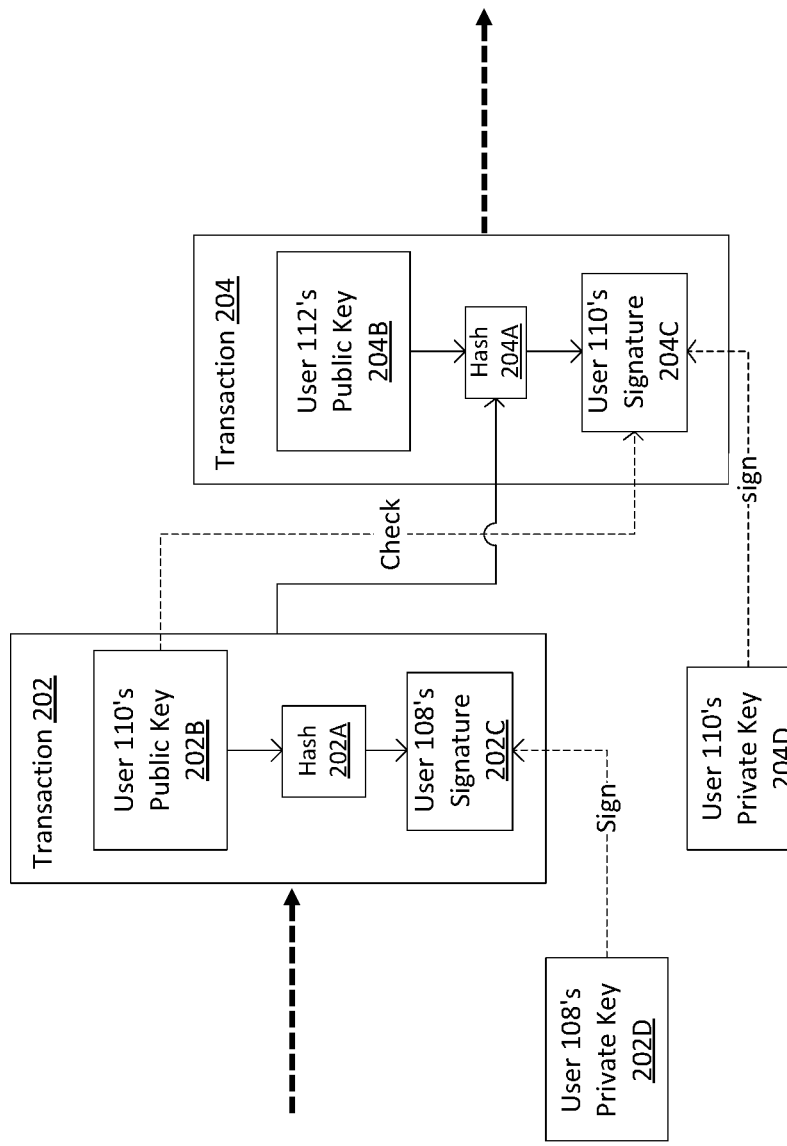
FIG. 2 is a block diagram of a distributed ledger, in accordance with some embodiments.

FIG. 2 is a diagram of a structure 200 of a distributed ledger, which may be generated through the interaction of components of computing environment 100. In the example of FIG. 2, user 110 is associated with client device 102, which executes a stored software application (e.g., an access application) capable of obtaining a current version of a distributed ledger from one or more networked computer systems (e.g., one of peer systems 160 configured to "mine" broadcasted transaction data and update ledgers). In some embodiments, a distributed ledger may represent a "longest" block-chain ledger than includes a maximum number of discrete "blocks." The blocks identify respective transactions performed by the distributed ledger 200, such as one or more certificate authority transactions.

FIG. 2 shows blocks corresponding to two transactions 202 and 204, with arrows to the left and right of these transactions indicating that these are merely two transactions in a potentially longer series of chained blocks (hence the term "block-chain ledger"). In the first transaction (transaction 202) depicted in FIG. 2, user 110 registers a public/private key pair and a digital certificate with a certificate authority (CA) stored on the distributed ledger 200. In the second transaction (transaction 204), the CA generates one or more requested child keys as discussed in more detail below.

One or more of peer systems 160 may receive the data specifying transactions 202, 204 from client device 104. In certain instances, peer systems 160 may act as "miners" for the distributed ledger, and may competitively process the received transaction data (either alone or in conjunction with other data) to generate additional blocks of the ledger, which may be appended to the distributed ledger and distributed across peer systems 160 (e.g., through a peer-to-peer network) and to other connected devices of environment 100.

Conventional distributed ledger architectures enable the public (or a selected group of brokers and/or systems) to review content of the ledgers and verify ownership details. The decentralized nature of distributed ledgers enables multiple distributed networks to verify the contents of a single ledger. The resulting redundancy may render distributed ledger architecture more robust than centralized server systems, and effectively eliminates the falsification of ledger data by malicious parties.

Client Devices

Referring back to FIG. 1, each of the client devices 102, 104 and/or the intermediate devices 106, 108 may include a computing device, such as a hashing computer, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and/or any other type of computing device that may be configured to store data and software instructions, execute software instructions to perform operations, and/or display information on a display device. At least one of client devices 102, 104 may be associated with one or more users, such as users 110, 112, as shown in FIG. 1. In some embodiments, each of the client devices 102, 104 and/or the intermediate devices 106, 108 can be associated with one or more members of a group 114, 116, such as, for example, one or more brokers Each client device 102, 104 and/or intermediate device 106, 108 includes one or more tangible, non-transitory memories that store data and/or software instructions, and one or more processors configured to execute software instructions. Client devices 102, 104 and/or intermediate devices 106, 108 may include one or more display devices that display information to a user and one or more input devices (e.g., keypad, keyboard, touchscreen, voice activated control technologies, or any other type of known input device) to allow the user to input information to the client device.

In one aspect, each client device 102, 104 and/or intermediate device 106, 108 stores in memory one or more software applications that run on the device and are executed by the one or more processors. In some instances, each device stores software applications that, when executed by one or more processors, perform operations that establish communications with a certificate authority 150. The certificate authority 150 can comprise one or more programs (or smart contracts) implemented on the distributed ledger 200. The certificate authority 150 is configured to validate, maintain, revoke, and/or otherwise manage one or more certificates and/or private/public key pairs associated with one or more users 110, 112, devices 102-108, groups of devices, domains, and/or groups of domains.

Each client device 102, 104 may execute the stored software application(s) to generate a transaction that to request, updated, invalidate, and/or otherwise manage a certificate issued by the CA 150. The executed software applications may cause client devices 102, 104 to transmit the data specifying the transaction 202. In distributed ledger-based systems, the client devices 102, 104 transmit a transaction 202 to one or more peers 160 for processing.

Exemplary Intermediary Devices

Intermediary devices 106, 108 may be a computing systems configured to execute software instructions to perform one or more operations in accordance with various embodiments. In one aspect, each of the intermediary systems 106, 108 are associated with one or more brokers. The intermediary devices 106, 108 are configured to provide message validation and forwarding of one or more messages received over the network 120. For example, in some embodiments, each of the intermediary devices 106, 108 comprise a node in a distributed nodal network. A first client device 102 can transmit a message over the distributed nodal network. The message is forward by one or more intermediary devices 106, 108 to a second client device 104.

In one aspect, intermediary devices 106, 108 include computing components configured to store, maintain, and generate data and software instructions. For example, intermediate devices 106, 108 may include one or more servers (e.g., server 142) and tangible, non-transitory memory devices (e.g., data repository 144). Server 142 may include one or more computing devices configured to execute software instructions to perform one or more processes in accordance with various embodiments. In one example, server 142 is a computing device that executes software instructions to perform operations that provide information to at least one other component of computing environment 100. In one embodiment, server 142 includes a computer (e.g., a personal computer, network computer, or mainframe computer) having one or more processors that are selectively activated or reconfigured by a computer program Intermediate devices 106, 108 may be incorporated as corresponding nodes in a distributed network or as a corresponding networked server in a cloud-computing environment. Furthermore, server 142 may communicate via network 120 with one or more additional servers (not shown), which may facilitate the distribution of processes for parallel execution by the additional servers.

In further aspects, certificate authority 150 may represent a "controlling entity" capable of managing (e.g., issuing, maintaining, updating, revoking, etc.) various public and/or private key pairs and/or certificates stored on the distributed ledger 200, in accordance with various embodiments. For example, in some embodiments, the certificate authority 150 is a smart contract (e.g., computer code) uploaded to and executed by the distributed ledger 200 to replace the need for a trusted certificate authority under conventional certificate processes.

Exemplary Communications Networks

Communications network 120 may include one or more communication networks or media of digital data communication. Examples of communication network 120 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. In accordance with various embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols in accordance with various embodiments also include protocols facilitating data transfer using radio frequency identification (RFID) communications and/or NFC. Moreover, communications network 120 may also include one or more mobile device networks, such as a GSM network or a PCS network, allowing client device 102 to send and receive data via applicable communications protocols, including those described herein.

In some embodiments, the communications network 120 is a distributed nodal network including each of the client devices 102, 104 and/or the intermediate devices 106, 108 as nodes within the distributed nodal network.

Exemplary Certificate Authority on Distributed Ledger

In some embodiments, a distributed ledger 200 is configured to execute one or more programs uploaded and/or encoded therein. For example, in some embodiments, a distributed ledger 200 is configured to execute one or more programs (or smart contracts) in response to one or more transactions uploaded to the distributed ledger 200 and/or processed by the peers 160.

In some embodiments, a distributed ledger 200 can be configured as a CA 150 to generate, validate, maintain, revoke, and/or otherwise manage one or more certificates. The distributed ledger 200 can be a specific distributed ledger configured to operate as a CA 150 and/or can be a distributed ledger 200 configured to execute one or more programs uploaded to the distributed ledger 200, including a CA 150 contract (program) uploaded thereto.

In some embodiments, a distributed ledger 200 includes a trust-free CA 150 program configured to provide for registration of one or more certificates and/or one or more private/public key pairs. A client device 102 can generate a transaction request (such as transaction 202) that is uploaded to the distributed ledger 200 to register a public/private key pair. The client device 102 generates a transaction request which is provided to one or more peer systems 160 for processing. The transaction request includes one or more identifiers associated with the client device 102 and/or a user 110. For example, in some embodiments, the transaction request includes a public/private key pair generated by the client device 102, a key generating value for generating a public/private key pair, device-related information (such as Internet Protocol (IP) address, a uniform resource identifier (URI), a domain associated with the client device 102, a group of domains and/or client devices associated with a single master public/private key pair, and/or any other suitable identifier.

In some embodiments, the distributed ledger 200 generates a certificate that is associated with the public/private key pair and identifies the owners of the public/private key pair. For example, in some embodiments, the certificate identifies the client device 102 as an owner of the public/private key pair. As another example, in some embodiments, the certificate can identify a group of user devices 102, 104 and/or domains that share a single master private/public key pair. The private key and at least one public key allow the client device 104 and/or an associated user 108 to sign one or more communications and/or transactions. In some embodiments, the public/private keys are generated by a key generating running concurrently with the CA 150. The key generator can be located on the distributed ledger 200, locally on each of the client devices 102, 104, and/or on a remote system.

In some embodiments, one or more public keys issued to the client device 102 can be disseminated to additional client devices 112 for use in public-key encryption. For example, in some embodiments, a first public key issued for the client device 102 and paired with a private key is provide to at least a second client device 104. The second client device 104 can use the first public key to encrypt one or more messages intended for the first client device 102. A message encrypted with a first public key (or any public key associated with the first client device 102) can only be decrypted using the associated private key (i.e., asymmetric encryption).

In some embodiments, the CA 150 is configured to generate one or more child keys derived from a registered master public/private key pair. For example, in some embodiments, a client device 104 can transmit a transaction to one or more peers 160 to generate additional certificates having one or more public and/or private keys associated therewith. In some embodiments, each of the additionally generated public/private keys are derived from the master public/private key associated with the client device 102 and/or a group including the client device 102. In some embodiments, the master public/private key is a master public/private key associated with one or more client devices 102, 104. The CA 150 can generate child public/private keys derived from the master public/private keys and disseminate child keys to each of the client devices 102, 104 in the associated group. The CA 150 can generate the child public/private keys automatically upon registration of a master public/private key and/or can generate child public/private keys in response to a specific request from one or more client devices 102, 104.

In some embodiments, a client device 102 can generate a transaction to revoke one or more public and/or private keys or certificates on a distributed ledger 200. For example, in some embodiments, a client device 102 generates a transaction 204 which is provided to one or more peers 160. The transaction 202 updates the CA 150 to indicate that one or more public/private keys (such as a child public/private key pair) has been compromised and should be revoked. Revoked public and/or private keys are no longer valid and messages signed with the revoked public/private keys are ignored. By issuing only child public/private keys for use in active messaging and encryption, the CA 150 can protect the master public/private key of the group from exposure and reduce the overhead burden for reissuing compromised certificates.

Figure 3:
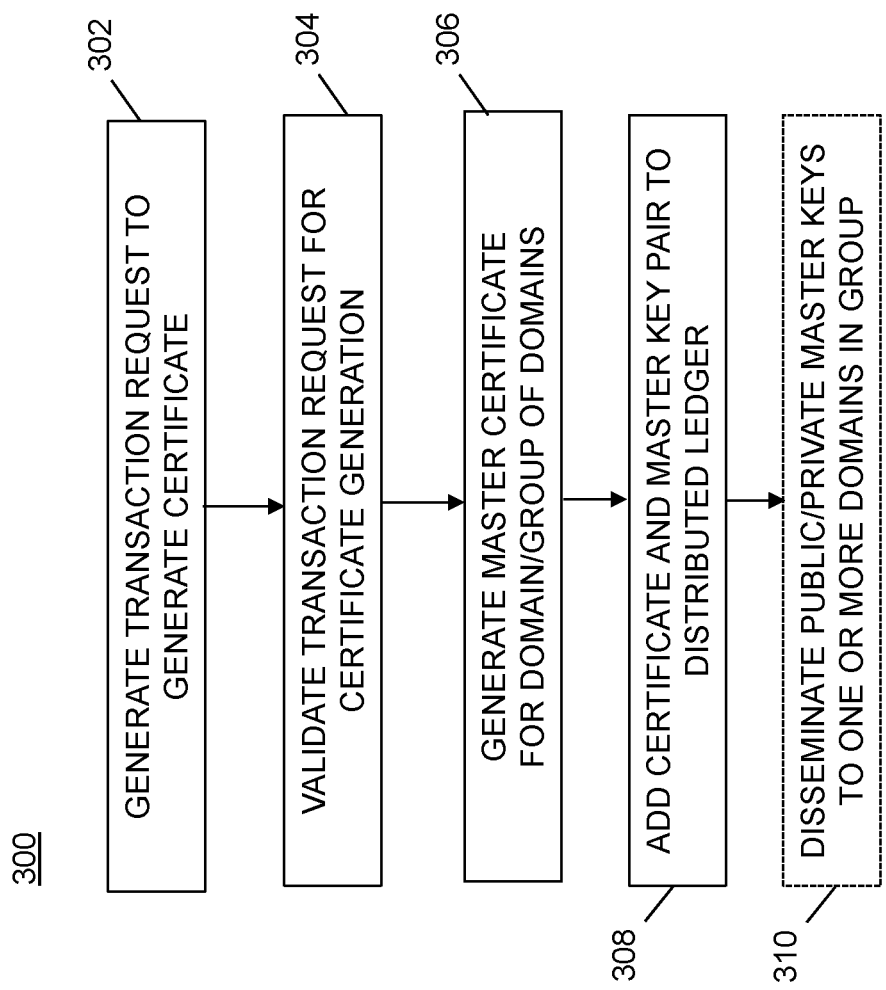
FIG. 3 is a flow chart of a method of registering a certificate with a certificate authority stored on a distributed ledger, in accordance with some embodiments.

FIG. 3 illustrates a method 300 of registering and/or generating a certificate with a CA 150 stored on a distributed ledger 200. At step 302, a client device 102 generates a transaction request that is provided to one or more peers 160. The transaction request can include a request to generate a certificate for a specific domain (or set of domains) and a public/private key pair. The transaction request can further include one or more user identifiers to verify ownership of the included domain(s) and/or membership in an identified group. For example, in some embodiments, a token or other identifier is included in the transaction request to identify the client device 102 as a member of a closed group. The transaction request is provided to one or more peers 160.

At step 304, the one or more peers validate the transaction request. Validation of the transaction request can include verifying that the requested domain(s) and/or group is unregistered on the distributed ledger 200, verifying the user identifiers and ownership of the domain(s)/membership in a group, verifying the validity of the public/private key pairs, and/or any other suitable validation steps. In some embodiments, a predetermined number of peers 160 must validate the transaction request in order for the registration to be considered valid.

At step 306, a master certificate is generated for the domain/group. The master certificate identifies the domain/group as being associated with the uploaded public/private key pair. For example, in some embodiments, the first peer 160 to process the transaction request generates a certificate, one or more private/public key pairs, and/or any other suitable certificate element. The certificate can be generated according to one or more predetermined certificate generation processes, such as, for example, a Certificate Signing Request (CSR), a Secure Sockets Layer (SSL) process, and/or any other suitable signature process. The certificate elements can be provided to the client device 102 and/or can be maintained on the distributed ledger 200. In some embodiments, the master certificate is used to generate one or more child certificates, as discussed in more detail below.

At step 308, the transaction request is validated and a transaction block 202 is added to the distributed ledger 200 registering the domain/group with certificate and the master public/private key pair. The transaction block 202 is distributed to multiple peers 160 each maintaining a local copy of the distributed ledger 200. In some embodiments, a predetermined number of peers 160 validate the registration upon receiving the transaction block 202.

At optional step 310, the master public/private keys are disseminated to one or more members of the domain/group, such as, for example, a client device 102, a client device 104, intermediate devices 106, 108, and/or any other suitable device.

Figure 4:
FIG. 4 is flow chart of a method of generating one or more child keys for one or more domains within a group of domains, in accordance with some embodiments.

FIG. 4 illustrates a method 350 for generating one or more child keys for one or more domains within a group of domains. At step 352, a client device 104 generates a transaction request including a request for the registration of one or more child key pairs. In some embodiments, the transaction request is generated using one or more device-related identifiers, a proposed child public/private key, and/or any other suitable information. In other embodiments, the CA 150 automatically generates one or more child key pairs after registering a master key pair for a domain/group. In some embodiments, the child public/private key is derived from the master public/private key using one or more key derivation functions (KDF) such as a keyed cryptographic hash function, although it will be appreciated that any suitable KDF can be used. The child public/private key can be derived by the client device 102 prior to generation of the transaction request, derived by the CA 150 during processing of the transaction request, and/or generated by a key generator stored on a remote system.

At step 354, the CA 150 associates the one or more derived child private/public keys with the master public/private key and/or the master certificate. For example, in some embodiments, the CA 150 updates the master certificate to include the one or more child public/private keys. In another embodiment, the CA 150 updates an accumulator configured to identify valid keys to include the one or more child public/private keys.

At step 356 the one or more child public/private keys are provided to one or more of the domains within the group associated with the master key. The child keys are configured for use in transmission and/or receipt of messages to and/or from the identified domain. For example, as discussed in more detail below, one or more child public/private keys can be used to generate one or more session keys for path agnostic transmission over a distributed nodal network. In other embodiments, the one or more child public/private keys can be used to sign transactions uploaded to the CA 150 and/or the distributed ledger 200. In some embodiments, the child public/private keys are used by one or more client devices 102 to generate encrypted messages for path agnostic transmission over a distributed nodal network.

Figure 5:
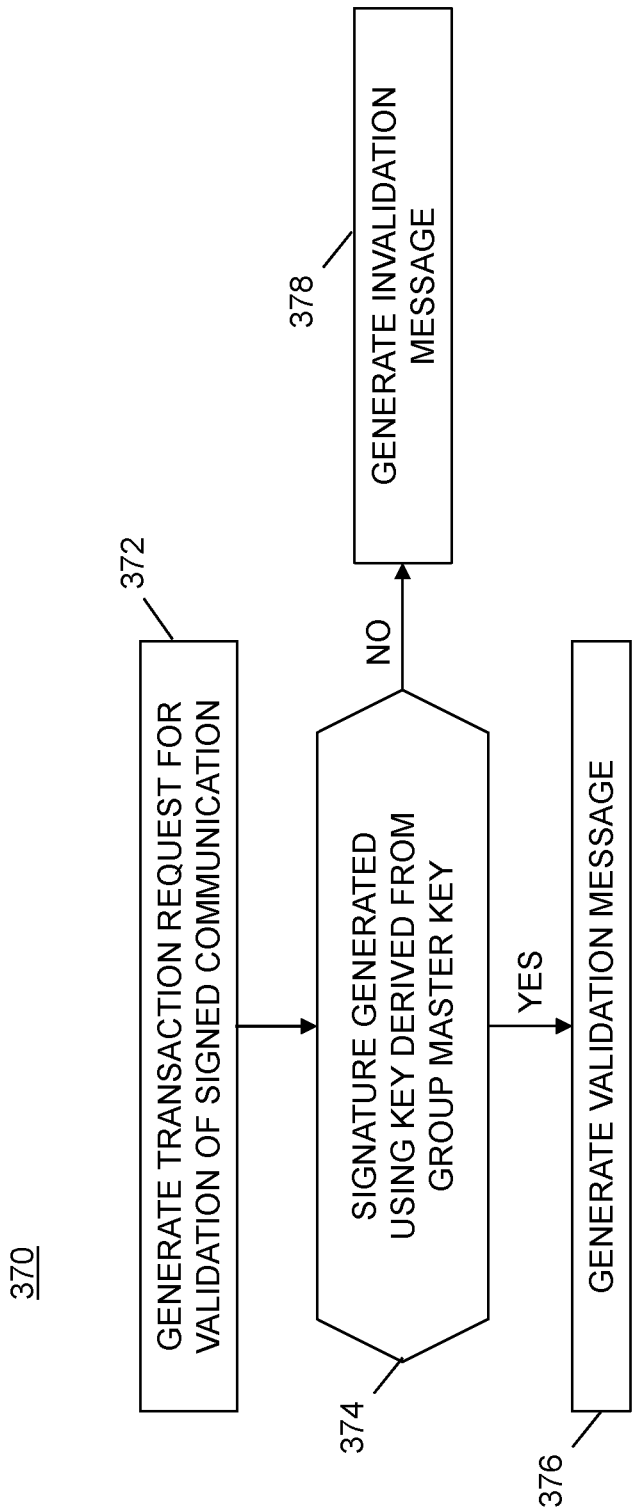
FIG. 5 is a flow chart illustrating one embodiment of a method of validating a child public/private key, in accordance with some embodiments.

FIG. 5 is a flow chart illustrating one embodiment of a method 370 of validating a child public/private key. At step 372, a device, such as an intermediate device 106, 108, generates a transaction request to the CA 150 requesting validation of a signature on one or more communications received by the device. For example, in some embodiments, the communication includes one or more messages received by the intermediate device 106, 108 and intended for forwarding to additional devices. The validation request includes the signature provided with the communication.

At step 374, the CA 150 determines whether the signature was generated using a public/private key derived from a master key associated with a group including a source domain of the message. For example, in some embodiments, the CA 150 utilizes one or more verification techniques, such as a verification technique associated with the KDF used to generate one or more child private/public keys. In some embodiments, the signature is verified using one or more accumulators configured to maintain a current state of multiple public/private keys registered with the CA 150.

If the signature is validated, the CA 150 generates a validation message at step 376. The validation message indicates that the public/private key used to sign the communication is derived from a master public/private key associated with a group and registered on the CA 150. The validation message only indicates that the public/private key used to sign the communication was derived from the master public/private key but does not identify the specific child key and/or domain associated with the specific child key used to sign the communication.

If the signature is not validated, the CA 150 generates an invalidation message at step 378. The invalidation message indicates that the public/private key used to sign the communication is not derived from a master public/private key associated with the group and registered on the CA 150. Child public/private keys can be used to provide path agnostic secure transmission over a distributed network.

Exemplary Secure Messaging

Figure 6:
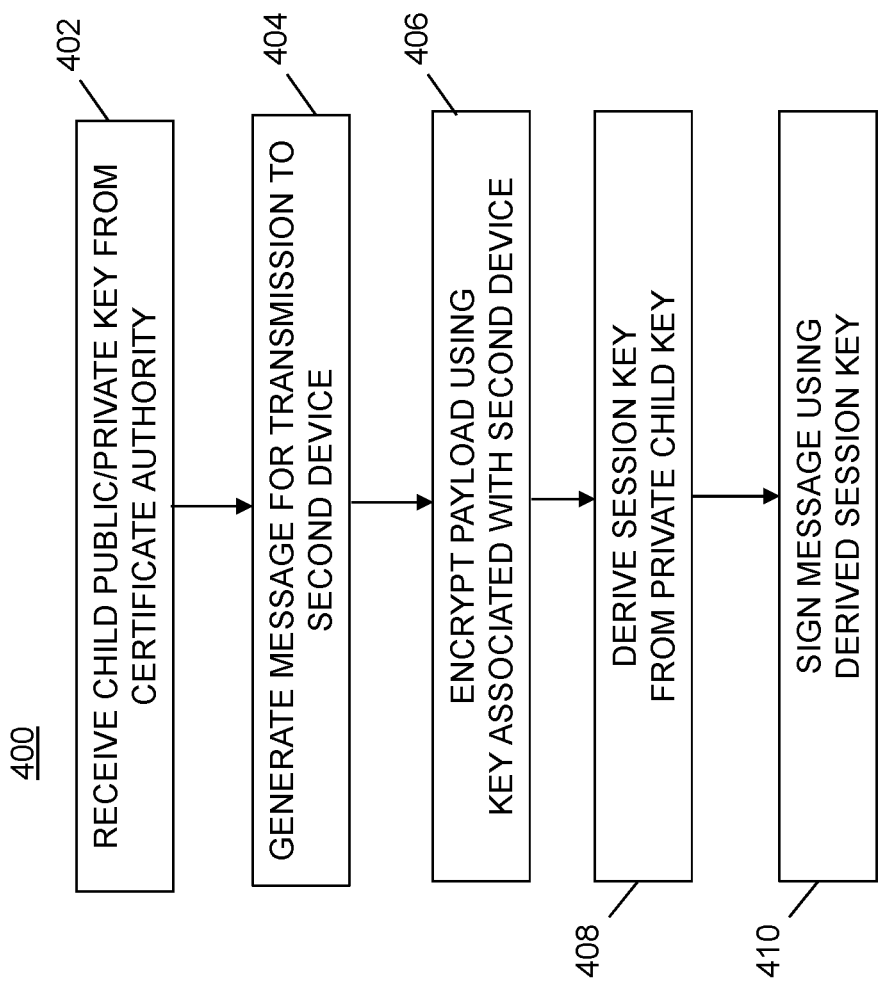
FIG. 6 is a flow chart illustrating one embodiment of a method for generating a secure message using one or more public/private keys maintained by a certificate authority on a distributed ledger, in accordance with some embodiments.

FIG. 6 illustrates one embodiment of a method 400 for generating a secure message using one or more public/private keys maintained by a CA 150. At step 402, a domain and/or client device 102 receives a child public/private key derived from a master public/private key. The child public/private key and/or the master public/private key can be generated according to any suitable methods, such as, for example, methods 300, 350 described above. In some embodiments, the child public/private key includes a key derived from a master public/private key associated with a group including the client device 102.

At step 404, the client device 102 generates a message for transmission. The message includes a payload portion containing information intended for a second client device 104. The payload portion of the message can include any suitable information for transmission to the second client device 104, such as, for example, financial information, transaction information, and/or any other suitable information. The first client device 102 can generate the first portion of the message according to any suitable messaging protocol.

At step 406, the first client device 102 encrypts the payload portion of the message. The first client device 102 can encrypt the first portion of the message using any suitable encryption scheme, such as, one or more public-asymmetric and/or symmetric encryption algorithms. For example, in some embodiments, the first client device 102 encrypts the payload portion of the message using a public-asymmetric algorithm using a public key of the second client device 104. As another example, in some embodiments, the first client device 102 can encrypt the payload portion of the message using a symmetric algorithm and a private key previously shared with the second client device. It will be appreciated that any suitable encryption algorithm(s) utilizing public and/or private key encryption can be used by the first client device 102.

At step 408, the first client device 102 derives a session key for use during transmission of the message. The session key is derived from the child public/private key previously provided to the first client device 102. The session key can be derived using any suitable KDF, such as, for example, a keyed cryptographic hash function, a key stretching function, and/or any other suitable KDF.

At step 410, the first client device 104 signs the message using the session key generated at step 408. The first client device 104 can sign the message using any known public/private key signature scheme, such as an RSA signature, SHA-2 signature, SHA-256, and/or any other suitable public/private key signature. The signature indicates that the message was generated by a client device 102 that is a member of a group associated with a specific certificate stored by the CA 150. The signature is generated using the session key, which is derived from the master public/private key associated with the group certificate. In some embodiments, the message can be transmitted to one or more nodes on a distributed nodal network for delivery to a second client device 106.

In some embodiments, one or more child public/private keys generated from one or more master encryption keys can be used to provide path agnostic transmission that obfuscates the transmission path of a message. In some embodiments, each individual layer of encryption for a message is shared with each of the nodes during a transmission. Session keys are generated by an originating client device 102 for each transmission within the transmission path. The session keys are generated in real-time (i.e., at the time of transmission). By using session keys generated for each individual transmission, each node is aware of only the immediately adjacent nodes. For example, if a first message from a first client device 102 uses a first real-time generated session key and a second message uses a second real-time generated session key, intermediate devices 106, 108 cannot determined that the first and second messages both originated with the same client device 102. A signature validation executed by the CA 150 allows the intermediate devices 106, 108 to verify the message at each stage without the need for each node to know the entire path of the message or know the originating/destination client devices 102, 104.

By providing encryption keys and/or certificates on a real-time basis (e.g., generated at the time of transmission), each client device 102, 104 can generate multiple child public/private keys which enables transmission across a distributed nodal network without the need to encode each individual transmission and without any of the intermediary nodes being aware of the final destination (except the destination-1 node). In some embodiments, multiple real-time generated session keys can be generated for a single transmission and/or for multiple portions of a single message transmitted over multiple transmissions.

Figure 7:
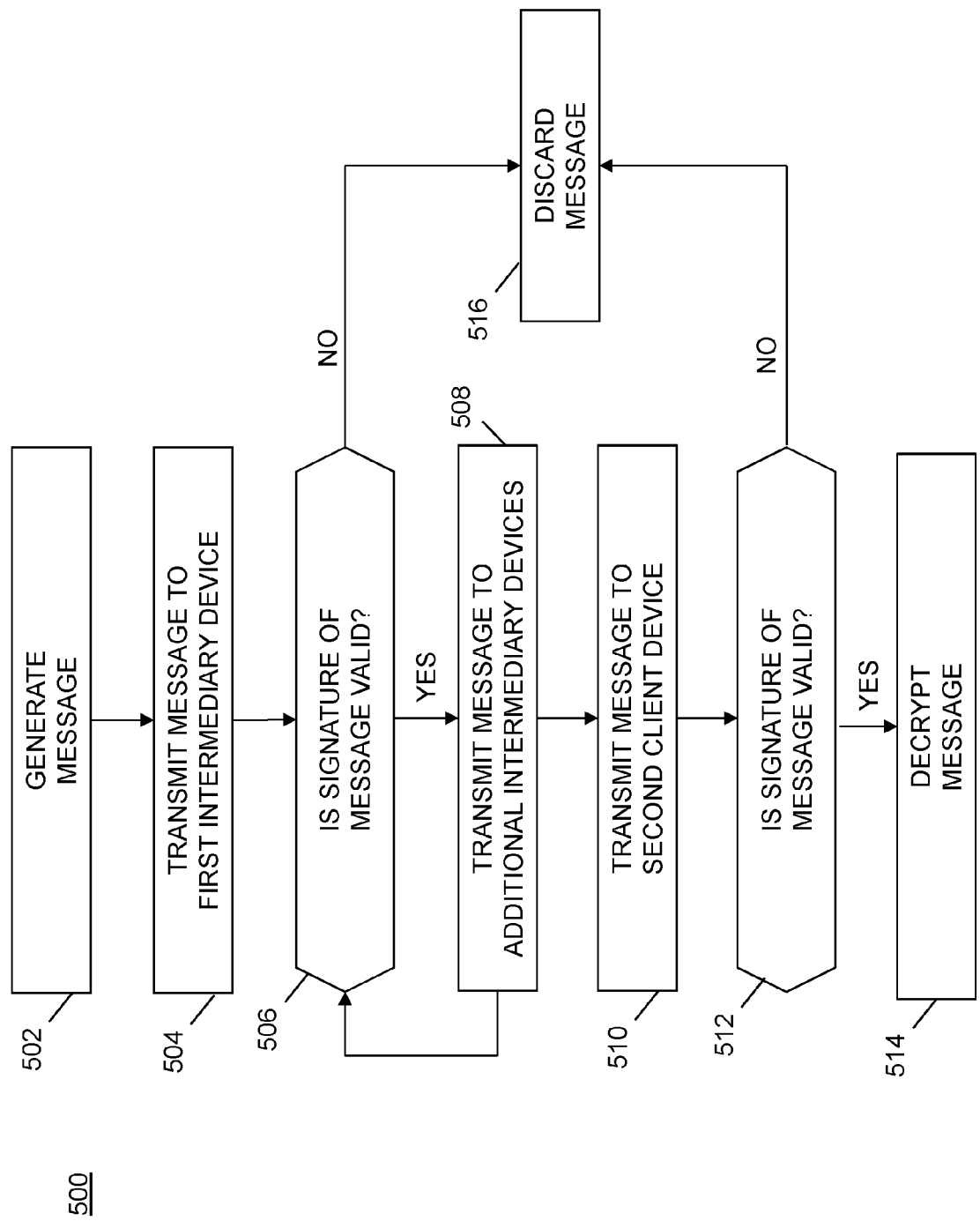
FIG. 7 is a flow chart illustrating one embodiment of a method of path agnostic transmission over a distributed nodal network.

FIG. 7 illustrates one embodiment of a method 500 of path agnostic transmission over a distributed nodal network. At step 502, a first client device 102 generates a message having a payload portion containing information intended for a second client device 104. The payload portion can be encrypted using a first key. The first client device 102 generates a session key and signs the message using the generated session key. For example, in some embodiments, the message is generated according to the method 400 illustrated in FIG. 6.

At step 504, the first client device 102 transmits the message to a first intermediary device 106 (or node). The first intermediary device 106 can be a node in a distributed nodal network, a node in a closed network (such as a broker-to-broker communication network), and/or any other suitable transmission/receive node. In some embodiments, the intermediate device 106 is a system maintained by one or more brokers in a distributed broker-exchange network.

At step 506, the first intermediary device 106 verifies the signature of the message. For example, in some embodiments, the first adjacent intermediary device 106 generates a verification request for the CA 150 on the distributed ledger 200. The CA 150 receives the validation request and reviews the session key-generated signature to determine whether the session key is derived from the master public/private key associated with the certificate identified in the message signature. In some embodiments, the CA 150 can verify the signature according to any suitable method, such as, for example, method 370 illustrated in FIG. 5. If the CA 150 verifies the authenticity of the message (i.e., verifies that the session key is derived from the master public/private key associated with the group certificate), the method proceeds to step 508. If the CA 150 fails to verify the authenticity of the message, the message is discarded at step 516 and the method 500 stops.

At step 508, the first intermediate device 106 transmits the message to one or more additional intermediate devices, such as a second intermediate device 108. The second intermediate device 108 receives the message and repeats steps 506-508 to validate and forward the message. At step 510, a final intermediate device (such as the intermediate device 108) transmits the message to the second client device 104. Because the message is signed with a session key and validation by the CA 150 indicates only that the key is derived from a master public/private key associated with a group, only the final intermediate device is aware that the message has been provided to the second client device 104.

When the message reaches the second client device 104 (e.g., the destination node), the second client device 106 verifies the authenticity of the message at step 512, for example, by verifying the session key with the CA 150. In some embodiments, the CA 150 can verify the signature according to any suitable method, such as, for example, method 370 illustrated in FIG. 5. After verifying the message, at step 514, the second client device 104 decrypts the message payload according to the one or more encryption schemes utilized by the first client device 102 to encrypt the payload. For example, in embodiments using public-asymmetric encryption, the second client device 104 uses a private key paired with the public key used by the first client device 102 for the initial encryption. If the message is not authenticated at step 512, the method 500 discards the message at step 516 and exits.

In some embodiments, the CA 150 is configured to track each of the session key validation requests to maintain a record of the transmission path of the message. The record maintained by the CA 150 can be used by the CA 150, the first client device 102, and/or the second client device 104 to verify the delivery route of the message. Each of the individual intermediate nodes 106, 108 is only aware of only the immediately adjacent nodes in the transmission, and are not aware of the entire request flow.

In some embodiments, the CA 150 is configured to aggregate each of the individual session key validation requests into a single aggregated signature. An aggregated signature combines a predetermined number of messages signed by a predetermined number of users into a single signature that is configured to verify that the predetermined number of users signed the predetermined number of messages. For example, in some embodiments, the CA 150 generates an aggregated signature that is provided to the first client device 102 and/or the second client device 104 to validate the number of hops and/or the transmission path of the message.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. An apparatus, comprising:
a communications interface
a storage device; and
a processor coupled to the storage device and the communications interface, the storage device storing software instructions for controlling the processor that when executed by the processor configure the processor to:
  generate a first message comprising a first payload portion;
  encrypt the first payload portion of the first message using a public cryptographic key associated with a destination device;
  generate a master cryptographic key for a domain that includes the apparatus and the destination device, and transmit, via the communications interface, the master cryptographic key to at least one peer computing system, the at least one peer computing system being configured to execute additional software instructions included within a ledger block of a distributed ledger, the executed additional software instructions causing the at least one peer computing system to generate a master certificate that includes the master cryptographic key and to perform operations that record the master certificate within an additional ledger block of the distributed ledger, the additional software instructions being associated with a certificate authority;
  derive a first session key from a domain-specific cryptographic key, the domain-specific cryptographic key being derived from the master cryptographic key and associated with the domain; and
  apply a first digital signature to the first message using the first session key; and
  transmit, via the communications interface, the first message and the first digital signature to an intermediate device, and perform operations that discard the first session key in response to the transmission of the first message, the intermediate device being configured to transmit the first digital signature to the at least one peer computing system, and the executed additional software instructions causing at least one peer computing system to determine whether the first session key is derived from the master cryptographic key,
  wherein the intermediate device corresponds to a first node of a distributed nodal network, the apparatus is associated with a first party, and the first node is associated with a second party.

2. The apparatus of claim 1, wherein:
the executed additional software instructions further cause the at least one peer computing system to derive the domain-specific key from the master cryptographic key and to broadcast the domain-specific key to the apparatus; and
prior to generating the first message, the processor is further configured to receive, via the communications interface, the domain-specific key from the at least one peer computing system and store the domain-specific key within the storage device.

3. The apparatus of claim 1, wherein the master certificate is associated with a plurality of domains, and wherein the domain-specific key is associated with one of the plurality of domains.

4. The apparatus of claim of 1, wherein the processor is further configured to:
  generate a second message comprising a second payload portion;
  encrypt the second payload portion of the second message using the public cryptographic key;
  derive a second session key from the domain-specific key, wherein the second session key is different than the first session key;
  apply a second signature to the second message using the second session key; and
  transmit, via the communications interface, the second message and the second digital signature to the intermediate system and perform operations that discard the second session key in response to the transmission of the second message.

5. The apparatus of claim 1, wherein the processor is further configured to:
receive, via the communications interface, at least one child cryptographic key from the at least one peer computing system, the child cryptographic key being derived from the master cryptographic key, and the child cryptographic key being associated with the domain; and
derive the first session key from the at least one child cryptographic key.

6. The apparatus of claim 5, wherein the at least one child cryptographic key comprises a private cryptographic key, and the processor is further configured to derive the first session key from the private cryptographic key.

7. The apparatus of claim of 1, wherein the intermediate device is configured to perform operations that validate the first digital signature based on the first session key, and based on the validation of the first digital signature, that route the first message and the first digital signature to at least one of (i) the destination device or (ii) an additional intermediate device.

8. The apparatus of claim 7, wherein the first session key obscures an identity of the apparatus from at least one of intermediate device or the additional intermediate device.

9. (A tangible, non-transitory computer-readable medium storing instructions that, when executed by at least one processor, cause the at least one processor to perform a method, comprising:
generating a first message comprising a first payload portion including data intended for a device;
encrypting the first payload portion of the first message using a public cryptographic key associated with the device;
generating a master cryptographic key for at least one of a plurality of domains, and transmitting the master cryptographic key to at least one peer computing system, the at least one peer computing system being configured to execute additional software instructions included within a ledger block of a distributed ledger, the executed additional software instructions causing the at least one peer computing system to generate a master certificate that includes the master cryptographic key and to perform operations that record the master certificate within an additional ledger block of the distributed ledger, and the additional software instructions being associated with a certificate authority;
deriving a first session key from a domain-specific cryptographic key, the domain specific cryptographic key being derived from the master cryptographic key and being associated with the at least one of the plurality of domains, and the device being associated with the at least one of the plurality of domains; and
applying a first digital signature to the first message using the first session key; and
transmitting the first message and the first digital signature from the first device to a first one of a plurality of intermediate devices, and performing operations that discard the first session key in response to the transmission of the first message, the first intermediate device being configured to transmit the first digital signature to the at least one peer computing system, the executed additional software instructions causing at least one peer computing system to determine whether the first session key is derived from the master cryptographic key,
wherein the first intermediate system corresponds to a first node of a distributed nodal network, the apparatus is associated with a first party, and the first node is associated with a second party.

10. A computer-implemented method, comprising:
generating, by at least one processor of a first device, a first message comprising a first payload portion including data intended for a second device;
encrypting, by the at least one processor, the first payload portion using a public cryptographic key associated with second device;
generating, by the at least one processor, a master cryptographic key for at least one of a plurality of domains, and transmitting, by the at least one processor the master cryptographic key to at least one peer computing system, the at least one peer computing system being configured to execute additional software instructions included within a ledger block of a distributed ledger, the executed additional software instructions causing the at least one peer computing system to generate a master certificate that includes the master cryptographic key and to perform operations that record the master certificate within an additional ledger block of the distributed ledger, and the additional software instructions being associated with a certificate authority;
deriving, by the at least one processor, a first session key from a domain-specific cryptographic key, the domain specific cryptographic key being derived from the master cryptographic key and being associated with the at least one of the plurality of domains, and the first device and the second device being associated with the at least one of the plurality of domains; and
applying, by at least one processor, a first digital signature to the first message using the first session key; and
transmitting, by at least one processor, the first message and the first digital signature from the first device to a first one of a plurality of intermediate devices and performing, by the at least one processor, operations that discard the first session key in response to the transmission of the first message, the first intermediate device being configured to transmit the first digital signature to the at least one peer computing system, the executed additional software instructions causing at least one peer computing system to determine whether the first session key is derived from the master cryptographic key,
wherein the first intermediate device corresponds to a first node of a distributed nodal network, the apparatus is associated with a first party, and the first node is associated with a second party.

11. The computer-implemented method of claim 10, wherein the domain-specific key comprises a private cryptographic key, the private cryptographic key being derived from a master cryptographic key included within the master certificate.

12. The computer-implemented method of claim 10, further comprising:
generating, by the at least one processor of the first device, a second message comprising
a second payload portion including data intended for a third device;

encrypting, by the at least one processor, the second payload portion using a public cryptographic key associated with third device;

deriving, by the at least one processor, a second session key from the domain-specific key; and applying, by the at least one processor, a second digital signature to the second message using the second session key; and transmitting, by the least one processor, the second message and the second digital signature from the first device to the first intermediate device and performing, by the at least one processor, operations that discard the second session key in response to the transmission of the second message.

13. The computer-implemented method of claim 12, wherein the first session key and the second session key are different.

14. The computer-implemented method of claim 10, wherein the first intermediate is configured to perform operations that validate the first digital signature based on the first session key, and based on the validation of the first digital signature, route the first message and the first digital signature to at least one of (i) the second device or (ii) a second one of the plurality of the intermediate devices.

15. The computer-implemented method of claim 10, wherein:

the executed additional software instructions further cause the at least one peer computing system to transmit a response to the first intermediate system indicative of the determination that the first session key is derived from the master cryptographic key; and the first intermediate device is further configured to validate the first digital signature based on the determination that the first session key is derived from the master cryptographic key.

16. The computer-implemented method of claim 10, wherein:

the method further comprises receiving, by the at least one processor, at least one child cryptographic key, the child cryptographic key being derived from a master cryptographic key included within the master certificate recorded onto the ledger block of the distributed ledger, and the child cryptographic key being associated with the at least one of the plurality of domains; and the deriving comprises deriving the first session key from the at least one child cryptographic key.

17. The computer-implemented method of claim 16, wherein the at least one child cryptographic key comprises a private cryptographic key, and the deriving further comprises deriving the first session key from the private cryptographic key.

* * * * *